Oct. 3, 1961  J. G. KYPER  3,002,311
FISHING LURE
Filed March 9, 1960
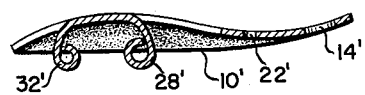
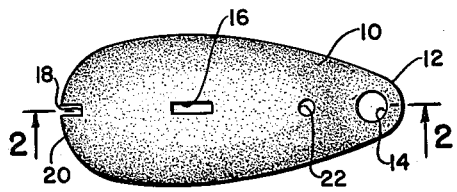
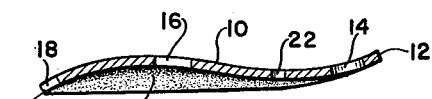
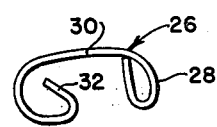
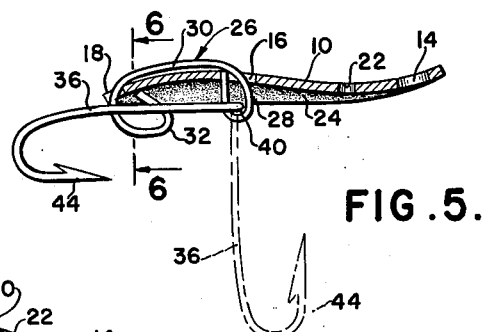
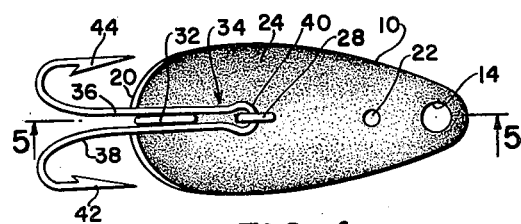
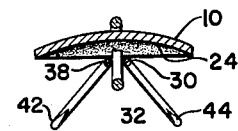
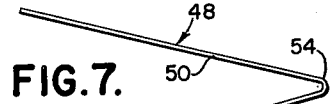
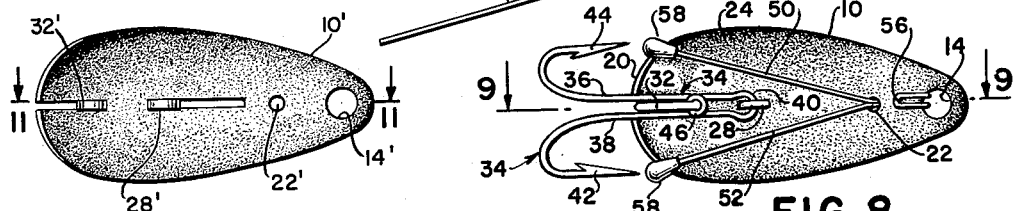
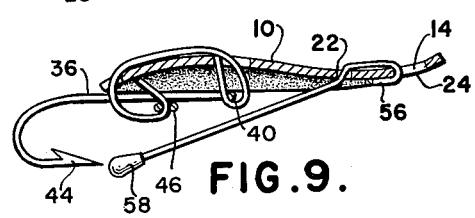
INVENTOR
James G. Kyper
BY  Karl W. Flocks
ATTORNEY

United States Patent Office 3,002,311
Patented Oct. 3, 1961

3,002,311
FISHING LURE
James G. Kyper, P.O. Box 355, Huntingdon, Pa.
Filed Mar. 9, 1960, Ser. No. 13,940
4 Claims. (Cl. 43—42.04)

This invention relates generally to fishing tackle, and more particularly to an improved spoon and method of assembling the same.

A primary object of the invention is to provide a novel lure comprising a spoon, including means for mounting the hooks in a ready and expeditious manner and whereby the hooks may be fixedly or pivotally secured on the spoon to provide a rigid base when struck by fish and yet afford pivotal movement relative to the spoon when the fish is being played.

A further object of the invention, in conformance with that set forth above, is to provide in a fishing lure of the character involved a construction whereby a novel clip may be utilized to mount a two-barbed hook in its optimum positions of use.

Another object of the invention, in conformance with that set forth above, is to provide in a fishing lure of the character involved, a novel mounting structure formed integrally from the spoon for the purpose of mounting a two-barbed hook in its optimum positions of use.

Yet another object of the invention, in conformance with that set forth above, is to provide in a fishing lure of the character involved a novel weed-guard including means whereby the same may be readily and expeditiously mounted on the spoon without the use of additional fasteners or the like.

A still further object of the invention is to provide a novel method for assembling a fishing lure comprising the assembling of a spoon with means whereby a simple fastener may be utilized to mount the hook thereof, and a weed-guard may be mounted in cooperating relationship to the hook without the use of auxiliary fasteners.

Other objects and the nature and advantages of the instant invention will be apparent from the following description of a preferred embodiment of the invention taken in conjunction with the accompanying drawing, wherein:

FIGURE 1 is a top plan view of the spoon member utilized in the invention;

FIGURE 2 is a longitudinal section taken on line 2—2 of FIGURE 1;

FIGURE 3 is an elevation of a resilient clip element utilized for mounting the hook of the lure on the spoon;

FIGURE 4 is a bottom plan view of the spoon with the clip element of FIGURE 3 affixed thereto and a two-barbed hook mounted on the clip;

FIGURE 5 is a longitudinal section taken on line 5—5 of FIGURE 4 showing by means of phantom lines an alternate position of the hook simulating that assumed after a fish has struck the lure;

FIGURE 6 is a section taken substantially on line 6—6 of FIGURE 5;

FIGURE 7 is a plan view of a resilient wire utilized to form a weed-guard of the lure;

FIGURE 8 is a bottom plan view of the lure of FIGURE 4 showing the weed-guard assembled and in operative position thereon;

FIGURE 9 is a longitudinal section taken on line 9—9 of FIGURE 8;

FIGURE 10 is a top plan view, similar to FIGURE 1, showing an alternative construction of the spoon where the hook mounting portions are formed integrally therewith; and FIGURE 11 is a longitudinal section taken substantially on line 11—11 of FIGURE 10.

Referring to the drawings in detail, in FIGURES 1 and 2 there is disclosed an elongated spoon indicated at 10, the spoon including at its narrow end 12 a transverse aperture portion 14 to which a fishing leader (not shown) will be secured, and having extending through an intermediate portion thereof a longitudinally extending slot portion 16 in alignment with a notched portion 18 extending through the edge of the rear end 20 of the spoon. Disposed between the aperture portion 14 and slot portion 16 is a transverse aperture portion 22. The undersurface of the spoon 10 is dished out, as indicated at 24.

Indicated generally at 26 is a resilient clip element including at one end a loop or eye portion 28 integral with a laterally extending resilient connecting portion 30 terminating in a reverse bend abutment or loop portion 32. The resilient clip element may be conveniently constructed from a suitable non-corrodible wire; however, if preferred the resilient clip may be constructed as a stamping.

In order to mount a hook indicated generally at 34 on the spoon 10, the eye portion 28 of the element 26 is inserted through the slot 16 and the portion 30 thereof will extend longitudinally along the outer surface of the spoon and the reverse bend loop portion 32 will extend through the notch 18 and be disposed on the underside 24 of the spoon. The hook 34 includes a pair of legs 36, 38 resiliently connected by a bight portion 40, the opposite ends of the legs 36, 38 terminating in reverse bend pronged barbs 42, 44, respectively.

In order to assemble the lure, i.e., utilizing the spoon, clip element and hook, one of the barbs 42 or 44 of the hook is threaded through the loop or eye portion 28 of the clip element disposed on the spoon, the legs 36, 38 may be yieldably urged apart to detachably engage opposite sides of the abutment or loop portion 32. When the lure is disposed in this condition, and a fish strikes the same, the legs 36, 38 will yield and permit the hook to be disposed in the phantom line position shown in FIGURE 5, which is desirable when the fish is being played. When the hook is disposed in trailing, engaged relationship with the abutment portion 32, there is provided a relatively solid base when a fish initially strikes the lure and thus provides means for readily and expeditiously setting the barbs of the hook in the fish.

Considering FIGURES 8 and 9, if it is desired to maintain the hook in a relatively fixed position with respect to the abutment portion 32, a suitable detachable loop element 46 may be threaded through the loop portion 32 to overlie the legs 36, 38 and thus prevent the pivotal movement illustrated by dotted lines in FIGURE 5.

Referring to FIGURES 10 and 11, an alternative embodiment of the spoon is disclosed. In this embodiment, the necessity for a separate resilient clip is eliminated. An elongated spoon is indicated generally at 10' and has a shape similar to that previously described in detail. In this embodiment, there is included transversely through the lure an aperture 14' for receiving a fishing leader, and an aperture 22' facilitating the mounting of the weed-guard to subsequently be described in detail. On the longitudinal axis of the lure, intermediately thereof is a struck-out, reverse bend loop portion 28', similar to and performing the same function as portion 28 of the resilient clip 26. In spaced longitudinal relationship from the portion 28' is a second depending and aligned struck-out portion 32' performing the same function as portion 32 of the resilient clip 26.

The struck-out loop portions 28', 32' will facilitate the mounting of the two-pronged hook in the manner previously described in detail. Additionally, the detachable loop element 46 may be threaded through the loop portion 32' to overlie the legs 36, 38 of the hook, for the purpose previously described in detail.

It will be noted in this embodiment that an even greater simplification of assembly has occurred in the basic construction of the lure, inasmuch as the separate resilient clip element 26 has been eliminated and comparable structure has been integrated with the spoon 10'.

Further, as will be described in detail, the hook 34 may be retained in a fixed condition when utilizing the weed-guard to be described.

The weed-guard basically comprises a V-shaped wire element, indicated generally at 48, and including converging legs 50 and 52. The legs 50 and 52 will be bent adjacent the apex 54 of the element 48 to form a bight portion 56, see FIGURES 8 and 9, which will first be threaded through the aperture portion 22, extend longitudinally across the outer surface of the spoon 10, see FIGURE 9, and then will be reversely bent through the aperture 14 and engaged beneath the undersurface of the spoon. The legs 50, 52 are resilient and displaceable but will normally be disposed in aligned relationship with the barbs 44, 42, respectively. If desired, suitable bead elements 58 may be secured on the terminal ends of the legs 50, 52, these bead elements being of a suitable color.

It will be noted that in the mounting of both the hook 34 and the weed-guard 48, no screws, rivets, or the like, are utilized. Additionally, if preferred, the locking loop 46 may be utilized with the hook 34, or, if desired, the lock ring 46 may be eliminated.

Thus there has been disclosed a novel fishing lure and method of assembling the same which fully conforms with the objects of invention heretofore set forth.

It will be obvious to those skilled in the art that various changes may be made without departing from the spirit of the invention and, therefore, the invention is not intended to be limited to what is shown in the drawings and described in the specification but only as defined in the appended claims.

What is claimed is:

1. Fishing tackle, comprising a spoon, said spoon including means at one end for securement to a fishing leader, said spoon including a longitudinally disposed intermediate slot portion and a notch portion in one edge thereof in alignment with said slot portion, a two-barbed hook including legs resiliently connected by a bight portion, and a resilient mounting clip including an eye portion extending through said slot portion and resiliently connected by an elongated body portion to an abutment portion received in said notch portion, said eye and abutment portion being longitudinally aligned at one side of said spoon, the bight portion of said hook extending transversely through said eye portion and the legs of said hook detachably engaging opposite sides of said abutment portion, said abutment portion including a second eye portion extending through said legs, and a fastening element extending transversely through said second eye portion to prevent disengagement of said legs from said second eye portion.

2. Fishing tackle comprising a spoon, said spoon including means at one end for securing a fishing line thereto, said spoon including longitudinally spaced mounting means depending from one side thereof for mounting a two-barbed hook in a pivotal or anchored condition on said spoon, said mounting means comprising a pair of longitudinally aligned loop portions, and a two-pronged hook including a bight portion and a pair of spaced parallel legs terminating in reverse bend barbed portions, said bight portion of the hook extending through one loop portion intermediately of said hook, said legs detachably engaging at intermediate portions thereof the other loop portion of said spoon, and a detachable fastener receivable in said other loop portion for anchoring the legs thereon.

3. The structure of claim 2; said mounting means comprising a single element detachably connected to said spoon.

4. The structure of claim 2; said mounting means comprising an integral portion of said spoon and being formed from portions longitudinally displaced therefrom.

References Cited in the file of this patent

UNITED STATES PATENTS

| | | |
|---|---|---|
| 1,339,832 | Pflueger et al. | May 11, 1920 |
| 1,700,332 | Pflueger | Jan. 29, 1929 |
| 1,806,088 | Schnell | May 19, 1931 |
| 2,333,590 | Schueller | Nov. 2, 1943 |
| 2,509,179 | Warnock | May 23, 1950 |
| 2,597,035 | Rickard | May 20, 1952 |
| 2,714,779 | Heiner | Aug. 9, 1955 |
| 2,895,252 | Tibbetts | July 21, 1959 |

FOREIGN PATENTS

| | | |
|---|---|---|
| 82,278 | Denmark | Mar. 4, 1957 |